US011986023B2

(12) United States Patent
Uthurry

(10) Patent No.: US 11,986,023 B2
(45) Date of Patent: May 21, 2024

(54) AEROSOL-GENERATING DEVICE HAVING TEMPERATURE-BASED CONTROL

(71) Applicant: Philip Morris Products S.A., Neuchatel (CH)

(72) Inventor: Jerome Uthurry, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 845 days.

(21) Appl. No.: 17/049,270

(22) PCT Filed: Apr. 23, 2019

(86) PCT No.: PCT/EP2019/060380
§ 371 (c)(1),
(2) Date: Oct. 20, 2020

(87) PCT Pub. No.: WO2019/206916
PCT Pub. Date: Oct. 31, 2019

(65) Prior Publication Data
US 2021/0235770 A1 Aug. 5, 2021

(30) Foreign Application Priority Data
Apr. 23, 2018 (EP) .................................... 18168846

(51) Int. Cl.
*A24F 40/57* (2020.01)
*A24F 40/46* (2020.01)
(Continued)

(52) U.S. Cl.
CPC .............. *A24F 40/57* (2020.01); *A24F 40/46* (2020.01); *A24F 40/50* (2020.01); *A24F 40/51* (2020.01);
(Continued)

(58) Field of Classification Search
CPC .......... A24F 40/51; A24F 40/10; A24F 40/20; A24F 40/57; A24F 40/46; A61M 11/041; A61M 11/042; H05B 1/0297
See application file for complete search history.

(56) References Cited

U.S. PATENT DOCUMENTS 9,498,000 B2 * 11/2016 Kuczaj ................. H05B 3/0014
10,130,780 B2 * 11/2018 Talon ..................... A24F 40/53
(Continued)

FOREIGN PATENT DOCUMENTS

| CN | 103338665 A | 10/2013 |
| CN | 103974638 A | 8/2014 |

(Continued)

OTHER PUBLICATIONS

Japanese Office Action dated Mar. 6, 2023 in Japanese Patent Application No. 2020-558519 (with English Translation), 10 pages.
(Continued)

*Primary Examiner* — Marcus E Harcum
(74) *Attorney, Agent, or Firm* — Oblon, McClelland, Maier & Neustadt, L.L.P.

(57) ABSTRACT

An aerosol-generating device is provided, including a cavity configured to receive an aerosol-forming substrate; an electrical heater configured to heat the substrate when the aerosol-forming substrate is received within the cavity; a power supply; and a controller configured to: control a supply of power from the power supply to the heater during a first time period and a second time period after the first time period, determine a rate of increase in temperature of the heater during the first time period by determining a time taken for a temperature of the heater to increase from a first predetermined temperature to a second predetermined temperature during the first time period, and adjust the supply of power from the power supply to the heater during the second
(Continued)

time period based on the determined rate of increase in temperature during the first time period.

13 Claims, 2 Drawing Sheets

(51) Int. Cl.
  *A24F 40/50* (2020.01)
  *A24F 40/51* (2020.01)
  *H05B 1/02* (2006.01)
  *A24F 40/20* (2020.01)
  *H02J 7/00* (2006.01)

(52) U.S. Cl.
  CPC ............ *H05B 1/0297* (2013.01); *A24F 40/20* (2020.01); *H02J 7/0042* (2013.01); *H02J 7/0063* (2013.01)

(56) References Cited

U.S. PATENT DOCUMENTS

| | | | |
|---|---|---|---|
| 2014/0020693 A1 | 1/2014 | Cochand et al. | |
| 2015/0230521 A1 | 8/2015 | Talon | |
| 2015/0237916 A1* | 8/2015 | Farine | A24F 40/53 219/492 |
| 2017/0027234 A1* | 2/2017 | Farine | A24F 40/53 |
| 2017/0251725 A1 | 9/2017 | Buchberger et al. | |
| 2018/0020735 A1 | 1/2018 | Bilat et al. | |
| 2019/0059448 A1 | 2/2019 | Talon | |
| 2019/0380389 A1* | 12/2019 | Hong | A24D 1/02 |
| 2020/0358300 A1* | 11/2020 | Akao | H02J 7/00041 |
| 2021/0401061 A1* | 12/2021 | Davis | A24F 40/57 |
| 2023/0254945 A1* | 8/2023 | Krietzman | A24B 15/16 392/390 |

FOREIGN PATENT DOCUMENTS

| | | |
|---|---|---|
| CN | 106604654 A | 4/2017 |
| EP | 2 468 117 A1 | 6/2012 |
| JP | 2015-536648 A | 12/2015 |
| JP | 2018-514191 A | 6/2018 |
| RU | 2 600 915 C1 | 10/2016 |
| RU | 2 621 596 C2 | 6/2017 |
| UA | 94396 C2 | 5/2011 |
| WO | WO 2013/098396 A2 | 7/2013 |
| WO | WO 2013/098397 A2 | 7/2013 |
| WO | WO 2016/150922 A2 | 9/2016 |
| WO | WO 2018/019533 A1 | 2/2018 |

OTHER PUBLICATIONS

Ukraine Notice of allowance dated Apr. 21, 2023 in Ukraine Patent Application No. a 2020 06356 (with English translation), 12 pages.
International Search Report and Written Opinion dated Aug. 14, 2019 in PCT/EP2019/060380 filed Apr. 23, 2019.
Russian Office Action and Search Report dated Aug. 15, 2022 in Russian Patent Application No. 2020134286 (with English translation), 15 pages.
Japanese Notice of Allowance dated Oct. 5, 2023 in Japanese Patent Application No. 2020-558519 (with English Translation), 3 pages.
Chinese Office Action and Search Report mailed on Jan. 9, 2024 issued in Chinese Patent Application No. 201980023457.5 filed on Apr. 23, 2019, with English Translation, total 9 pages.

* cited by examiner

AEROSOL-GENERATING DEVICE HAVING TEMPERATURE-BASED CONTROL

The present invention relates to an aerosol-generating device having a controller arranged to control a supply of power to an electrical heater based on a determined rate of increase in temperature. The present invention also relates to an aerosol-generating system comprising the aerosol-generating device. The present invention also relates to a method of controlling an aerosol-generating device and a computer program for carrying out the method.

One type of aerosol-generating system is an electrically operated smoking system. Known handheld electrically operated smoking systems typically comprise an aerosol-generating device comprising a battery, control electronics and an electric heater for heating a smoking article designed specifically for use with the aerosol-generating device. The smoking article comprises an aerosol-forming substrate. In some examples, the aerosol-forming substrate is in the form of a plug, such as a tobacco plug, and the electric heater contained within the aerosol-generating device is inserted into the aerosol-forming substrate when the smoking article is inserted into the aerosol-generating device.

Typically, the aerosol-generating device is configured to generate heat using the electric heater according to a predetermined heating profile. However, variations in the aerosol-forming substrate may result in undesirable variations in a user experience. For example, in high humidity environments, the aerosol-forming substrate may exhibit a high water content. Since water is aerosolised at typical operating temperatures for aerosol-generating devices, a high water content may result in an undesirably high perceived aerosol temperature by a user. In another example, an aerosol-forming substrate that has already been heated may exhibit a low water content. A low water content will result in a reduced transfer of heat from the aerosol-forming substrate if a user attempts to re-heat the aerosol-forming substrate in an aerosol-generating device. The reduced transfer of heat from the aerosol-forming substrate may result in overheating of the aerosol-generating device.

It would be desirable to provide an aerosol-generating device that mitigates or overcomes at least some of the disadvantages with known aerosol-generating devices.

According to a first aspect of the present invention there is provided an aerosol-generating device comprising a cavity for receiving an aerosol-forming substrate and an electrical heater arranged to heat an aerosol-forming substrate when the aerosol-forming substrate is received within the cavity. The aerosol-generating device also comprises a power supply and a controller arranged to control a supply of power from the power supply to the electrical heater during a first time period and a second time period after the first time period. The controller is also arranged to determine a rate of increase in temperature of the electrical heater during the first time period. The controller is also arranged to adjust the supply of power from the power supply to the electrical heater during the second time period based on the determined rate of increase in temperature during the first time period.

Advantageously, the controller is arranged to determine a rate of increase in temperature of the electrical heater during a first time period. Advantageously, the determined rate of increase in temperature may be indicative of a water content of an aerosol-forming substrate received within the cavity. A relatively low determined rate of increase in temperature may be indicative of a relatively high water content. A relatively high determined rate of increase in temperature may be indicative of a relatively low water content. Advantageously, based on the determined rate of increase in temperature, the controller varies a supply of power to the electrical heater during a subsequent second time period to adjust further heating of the electrical heater.

Preferably, the first time period is sufficiently long to ensure a measurable increase in the temperature of the electrical heater across a range of water contents for the aerosol-forming substrate. Preferably, the first time period is at least about 1 second, more preferably at least about 2 seconds, more preferably at least about 3 seconds.

Preferably, the first time period is sufficiently short to minimise the time before the controller varies the supply of power to the electrical heater during the second time period to provide a desired user experience. Preferably, the first time period is less than about 15 seconds, more preferably less than about 14 seconds, more preferably less than about 13 seconds, more preferably less than about 12 seconds, more preferably less than about 11 seconds, more preferably less than about 10 seconds.

The controller may be arranged to determine a rate of increase in temperature of the electrical heater by determining an increase in temperature of the electrical heater over a fixed time period. The controller may be arranged to determine a rate of increase in temperature of the electrical heater for the entire first time period. The controller may be arranged to determine a rate of increase in temperature of the electrical heater based on a first temperature of the electrical heater determined at the start of the first time period and a second temperature of the electrical heater determined at the end of the first time period.

The controller may be arranged to determine a rate of increase in temperature of the electrical heater by determining the time taken for a predetermined increase in temperature of the electrical heater to occur. The controller may be arranged to determine a rate of increase in temperature of the electrical heater during a portion of the first time period. The controller may be arranged to determine a time taken for a temperature of the electrical heater to increase from a first predetermined temperature to a second predetermined temperature during the first time period, wherein the determined time is the determined rate of increase in temperature.

Preferably, the first predetermined temperature is above any anticipated ambient temperature. Advantageously, a first predetermined temperature above ambient temperature may minimise or eliminate any variation in ambient temperature on the determined rate of increase in temperature of the electrical heater. Preferably, the first predetermined temperature is at least about 50 degrees Celsius, preferably at least about 60 degrees Celsius, preferably at least about 70 degrees Celsius, preferably at least about 80 degrees Celsius, preferably at least about 90 degrees Celsius. The first predetermined temperature may be 100 degrees Celsius. It is understood that numerical values specified herein encompass a range of values around the specified value based on variations resulting from manufacturing tolerances and accuracy of measuring instruments.

Preferably, the second predetermined temperature is below a target operating temperature of the electrical heater during the second period of time. Advantageously, a second predetermined temperature below a target operating temperature may facilitate determination of the rate of increase in temperature of the electrical heater before the controller is required to begin adjusting the supply of power to the electrical heater during the second time period. Preferably, the second predetermined temperature is less than about 300 degrees Celsius, preferably less than about 290 degrees Celsius, preferably less than about 280 degrees Celsius, preferably less than about 270 degrees Celsius, preferably less than about 260 degrees Celsius. The second predetermined temperature may be 250 degrees Celsius.

Preferably, the controller is arranged to supply power from the power supply to the electrical heater at a constant rate for the first time period. Advantageously, supplying power to the electrical heater at a constant rate for the first time period may facilitate an accurate determination of the rate of increase in temperature of the electrical heater during the first time period. Preferably, the controller is arranged to supply power from the power supply to the electrical heater at a duty cycle of at least about 95 percent during the first time period.

Preferably, the controller is arranged to supply power from the power supply to the electrical heater at a first rate or a second rate during the second time period based on a comparison of the determined rate of increase in temperature with a first threshold, wherein the second rate is larger than the first rate. The first rate may be described as a reduced rate or a lower rate. The second rate may be described as a normal rate. The first threshold may be indicative of a threshold between a normal water content of the aerosol-forming substrate and a high water content of the aerosol-forming substrate. In other words, a determined rate of increase in temperature below the first threshold may be indicative of a high water content of the aerosol-forming substrate. A determined rate of increase in temperature above the first threshold may be indicative of a normal water content of the aerosol-forming substrate.

In embodiments in which the controller determines a rate of increase in temperature of the electrical heater by determining an increase in temperature of the electrical heater over a fixed time period, the first threshold may be a temperature increase threshold. The controller is arranged to supply power to the electrical heater at the first rate when the determined increase in temperature is below the first threshold. The controller is arranged to supply power to the electrical heater at the second rate when the determined increase in temperature is above the first threshold. The first threshold may be a temperature increase of between about 230 degrees Celsius and about 250 degrees Celsius. The first threshold may be a temperature increase of between about 240 degrees Celsius and about 250 degrees Celsius.

In embodiments in which the controller determines a rate of increase in temperature of the electrical heater by determining the time taken for a predetermined increase in temperature of the electrical heater to occur, the first threshold may be a time threshold. The controller is arranged to supply power to the electrical heater at the first rate when the determined time is above the first threshold. The controller is arranged to supply power to the electrical heater at the second rate when the determined time is below the first threshold. The first threshold may be a time of between about 3 seconds and about 10 seconds. The first threshold may be a time of between about 5 seconds and about 7 seconds. The first threshold may be a time of 5.2 seconds.

Preferably, the controller is arranged to prevent the supply of power from the power supply to the electrical heater based on a comparison of the determined rate of increase in temperature with a second threshold, wherein the second threshold is different to the first threshold. The second threshold may be indicative of a threshold between a normal water content of the aerosol-forming substrate and a low water content of the aerosol-forming substrate. In other words, a determined rate of increase in temperature below the second threshold may be indicative of a normal water content of the aerosol-forming substrate. A determined rate of increase in temperature above the second threshold may be indicative of a low water content of the aerosol-forming substrate.

In embodiments in which the controller determines a rate of increase in temperature of the electrical heater by determining an increase in temperature of the electrical heater over a fixed time period, the second threshold may be a temperature increase threshold. The controller is arranged to supply power to the electrical heater at the second rate when the determined increase in temperature is above the first threshold and below the second threshold. The controller is arranged to prevent the supply of power to the electrical heater when the determined increase in temperature is above the second threshold. The second threshold may be a temperature increase of between about 310 degrees Celsius and about 330 degrees Celsius. The second threshold may be a temperature increase of between about 310 degrees Celsius and about 320 degrees Celsius.

In embodiments in which the controller determines a rate of increase in temperature of the electrical heater by determining the time taken for a predetermined increase in temperature of the electrical heater to occur, the second threshold may be a time threshold. The controller is arranged to supply power to the electrical heater at the second rate when the determined time is below the first threshold and above the second threshold. The controller is arranged to prevent the supply of power to the electrical heater when the determined time is below the second threshold. The second threshold may be a time of between about 4 seconds and about 5 seconds.

Preferably, the controller is arranged to determine an ambient temperature.

In embodiments in which the first threshold is a temperature increase threshold, preferably, the controller is arranged to supply power from the power supply to the electrical heater at the first rate when the determined increase in temperature of the electrical heater is below the first threshold and the determined ambient temperature is above an ambient temperature threshold.

In embodiments in which the first threshold is a time threshold, preferably, the controller is arranged to supply power from the power supply to the electrical heater at the first rate when the determined time is above the first threshold and the determined ambient temperature is above an ambient temperature threshold.

In embodiments in which the first threshold is a temperature increase threshold, preferably, the controller is arranged to supply power from the power supply to the electrical heater at the second rate when the determined increase in temperature of the electrical heater is below the first threshold and the determined ambient temperature is below the ambient temperature threshold.

In embodiments in which the first threshold is a time threshold, preferably, the controller is arranged to supply power from the power supply to the electrical heater at the second rate when the determined time is above the first threshold and the determined ambient temperature is below the ambient temperature threshold.

The present inventors have recognised that the rate of increase in temperature of an aerosol-forming substrate having a normal water content may be significantly slower when the ambient temperature is low. In other words, in a cold environment, the determined rate of increase in temperature of the electrical heater when used with an aerosol-forming substrate having a normal water content may be similar to the determined rate of increase in temperature of the electrical heater when used with an aerosol-forming substrate having a high water content at a normal ambient temperature. Therefore, advantageously, supplying power to the electrical heater at the first rate during the second time period only when the ambient temperature is above an ambient temperature threshold may reduce or prevent the controller supplying energy at the first rate when using the aerosol-generating device with an aerosol-forming substrate having a normal water content at a low ambient temperature. The present inventors have recognised that, when the ambient temperature is low, it is not necessary to supply power to the electrical heater at the first rate for aerosol-forming substrate having a high water content. In particular, advantageously, the cool ambient air entering the aerosol-generating device during use is sufficient to maintain the temperature of the generated aerosol at a level acceptable to a user, even when the aerosol-forming substrate has a high water content.

Preferably, the ambient temperature threshold is between about 15 degrees Celsius and about 25 degrees Celsius, preferably between about 17 degrees Celsius and about 23 degrees Celsius. The ambient temperature threshold may be 18 degrees Celsius.

The aerosol-generating device may comprise a temperature sensor arranged to sense the ambient temperature, wherein the controller is arranged to determine the ambient temperature based on a signal received from the temperature sensor. The temperature sensor may comprise a thermistor. The temperature sensor may comprise a thermocouple. The temperature sensor may comprise a semiconductor temperature sensor.

To facilitate determining the rate of increase in temperature of the electrical heater, preferably the controller is arranged to determine a temperature of the electrical heater. Preferably, the electrical heater comprises at least one resistive heating element, wherein the controller is arranged to determine a temperature of the at least one resistive heating element based on a resistance of the at least one resistive heating element. The controller may comprise a circuit arranged to measure a resistance of the at least one resistive heating element. The controller may be arranged to determine a temperature of the at least one resistive heating element by comparing the measured resistance to a calibrated curve of resistance against temperature.

Preferably, the electrical heater comprises a plurality of resistive heating elements. Preferably, the resistive heating elements are electrically connected in a parallel arrangement. Advantageously, providing a plurality of resistive heating element electrically connected in a parallel arrangement may facilitate the delivery of a desired electrical power to the electrical heater while reducing or minimising the voltage required to provide the desired electrical power. Advantageously, reducing or minimising the voltage required to operate the electrical heater may facilitate reducing or minimising the physical size of the power supply.

The electrical heater may comprise an electrically insulating substrate, wherein the at least one resistive heating element is provided on the electrically insulating substrate.

Preferably, the electrically insulating substrate is stable at an operating temperature of the electrical heater. Preferably, the electrically insulating substrate is stable at temperatures of up to about 400 degrees Celsius, more preferably about 500 degrees Celsius, more preferably about 600 degrees Celsius, more preferably about 700 degrees Celsius, more preferably about 800 degrees Celsius. The operating temperature of the electrical heater during use may be at least about 200 degrees Celsius. The operating temperature of the electrical heater during use may be less than about 700 degrees Celsius. The operating temperature of the electrical heater during use may be less than about 600 degrees Celsius. The operating temperature of the electrical heater during use may be less than about 500 degrees Celsius. The operating temperature of the electrical heater during use may be less than about 400 degrees Celsius.

The electrically insulating substrate may be a ceramic material such as Zirconia or Alumina. Preferably, the electrically insulating substrate has a thermal conductivity of less than or equal to about 2 Watts per metre Kelvin.

Suitable materials for forming the at least one resistive heating element include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium- titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal® and iron-manganese-aluminium based alloys.

In some embodiments, the at least one resistive heating element comprises one or more stamped portions of electrically resistive material, such as stainless steel. Alternatively, the at least one resistive heating element may comprise a heating wire or filament, for example a Ni—Cr (Nickel-Chromium), platinum, tungsten or alloy wire.

The electrical heater may be arranged for insertion into an aerosol-forming substrate when the aerosol-forming substrate is received within the cavity. The electrical heater may be positioned within the cavity. The electrical heater may be an elongate electrical heater. The elongate electrical heater may be blade-shaped. The elongate electrical heater may be pin-shaped. The elongate electrical heater may be cone-shaped. The elongate electrical heater may be blade-shaped.

The power supply may be a DC voltage source. In preferred embodiments, the power supply is a battery. For example, the power supply may be a nickel-metal hydride battery, a nickel cadmium battery, or a lithium based battery, for example a lithium-cobalt, a lithium-iron-phosphate or a lithium-polymer battery. The power supply may alternatively be another form of charge storage device such as a capacitor. The power supply may require recharging and may have a capacity that allows for the storage of enough energy for use of the aerosol-generating device with one or more aerosol-forming substrates.

Preferably, the aerosol-generating device comprises a housing. Preferably, the housing at least partially defines the cavity for receiving an aerosol-forming substrate.

Preferably, the aerosol-generating device comprises at least one air inlet in fluid communication with the cavity. In embodiments in which the aerosol-generating device comprises a housing, preferably the housing at least partially defines the at least one air inlet. Preferably, the at least one air inlet is in fluid communication with an upstream end of the cavity. In embodiments in which the electrical heater is an elongate electrical heater positioned within the cavity, preferably the elongate electrical heater extends into the cavity from the upstream end of the cavity.

The aerosol-generating device may comprise a sensor to detect air flow indicative of a consumer taking a puff. The air flow sensor may be an electro-mechanical device. The air flow sensor may be any of: a mechanical device, an optical device, an opto-mechanical device and a micro electro-mechanical systems (MEMS) based sensor. The aerosol-generating device may comprise a manually operable switch for a consumer to initiate a puff.

Preferably, the aerosol-generating device comprises an indicator for indicating when the electrical heater is activated. The indicator may comprise a light, activated when the electrical heater is activated.

The aerosol-generating device may comprise at least one of an external plug or socket and at least one external electrical contact allowing the aerosol-generating device to be connected to another electrical device. For example, the aerosol-generating device may comprise a USB plug or a USB socket to allow connection of the aerosol-generating device to another USB enabled device. For example, the USB plug or socket may allow connection of the aerosol-generating device to a USB charging device to charge a rechargeable power supply within the aerosol-generating device. The USB plug or socket may additionally, or alternatively, support the transfer of data to or from, or both to and from, the aerosol-generating device. Additionally, or alternatively, the aerosol-generating device may be connected to a computer to transfer data to the device, such as new heating profiles for new aerosol-generating articles.

In those embodiments in which the aerosol-generating device comprises a USB plug or socket, the aerosol-generating device may further comprise a removable cover that covers the USB plug or socket when not in use. In embodiments in which the USB plug or socket is a USB plug, the USB plug may additionally or alternatively be selectively retractable within the device.

According to a second aspect of the present invention there is provided an aerosol-generating system comprising an aerosol-generating device according to the first aspect of the present invention, in accordance with any of the embodiments described herein, and an aerosol-generating article comprising an aerosol-forming substrate.

As used herein, the term "aerosol-generating article" refers to an article comprising an aerosol-forming substrate that, when heated, releases volatile compounds that can form an aerosol.

The aerosol-forming substrate may comprise tobacco.

The aerosol-forming substrate may comprise a plug of tobacco. The tobacco plug may comprise one or more of: powder, granules, pellets, shreds, spaghettis, strips or sheets containing one or more of: tobacco leaf, fragments of tobacco ribs, reconstituted tobacco, homogenised tobacco, extruded tobacco and expanded tobacco. Optionally, the tobacco plug may contain additional tobacco or non-tobacco volatile flavour compounds, to be released upon heating of the tobacco plug. Optionally, the tobacco plug may also contain capsules that, for example, include the additional tobacco or non-tobacco volatile flavour compounds. Such capsules may melt during heating of the tobacco plug. Alternatively, or in addition, such capsules may be crushed prior to, during, or after heating of the tobacco plug.

Where the tobacco plug comprises homogenised tobacco material, the homogenised tobacco material may be formed by agglomerating particulate tobacco. The homogenised tobacco material may be in the form of a sheet. The homogenised tobacco material may have an aerosol-former content of greater than 5 percent on a dry weight basis. The homogenised tobacco material may alternatively have an aerosol former content of between 5 percent and 30 percent by weight on a dry weight basis. Sheets of homogenised tobacco material may be formed by agglomerating particulate tobacco obtained by grinding or otherwise comminuting one or both of tobacco leaf lamina and tobacco leaf stems; alternatively, or in addition, sheets of homogenised tobacco material may comprise one or more of tobacco dust, tobacco fines and other particulate tobacco by-products formed during, for example, the treating, handling and shipping of tobacco. Sheets of homogenised tobacco material may comprise one or more intrinsic binders, that is tobacco endogenous binders, one or more extrinsic binders, that is tobacco exogenous binders, or a combination thereof to help agglomerate the particulate tobacco. Alternatively, or in addition, sheets of homogenised tobacco material may comprise other additives including, but not limited to, tobacco and non-tobacco fibres, aerosol-formers, humectants, plasticisers, flavourants, fillers, aqueous and non-aqueous solvents and combinations thereof. Sheets of homogenised tobacco material are preferably formed by a casting process of the type generally comprising casting a slurry comprising particulate tobacco and one or more binders onto a conveyor belt or other support surface, drying the cast slurry to form a sheet of homogenised tobacco material and removing the sheet of homogenised tobacco material from the support surface.

The aerosol-generating article may have a total length of between approximately 30 millimetres and approximately 100 millimetres. The aerosol-generating article may have an external diameter of between approximately 5 millimetres and approximately 13 millimetres.

The aerosol-generating article may comprise a mouthpiece positioned downstream of the tobacco plug. The mouthpiece may be located at a downstream end of the aerosol-generating article. The mouthpiece may be a cellulose acetate filter plug. Preferably, the mouthpiece is approximately 7 millimetres in length, but can have a length of between approximately 5 millimetres to approximately 10 millimetres.

The tobacco plug may have a length of approximately 10 millimetres. The tobacco plug may have a length of approximately 12 millimetres.

The diameter of the tobacco plug may be between approximately 5 millimetres and approximately 12 millimetres.

In a preferred embodiment, the aerosol-generating article has a total length of between approximately 40 millimetres and approximately 50 millimetres. Preferably, the aerosol-generating article has a total length of approximately 45 millimetres. Preferably, the aerosol-generating article has an external diameter of approximately 7.2 millimetres.

According to a third aspect of the present invention, there is provided a method of controlling an aerosol-generating device having a cavity for receiving an aerosol-forming substrate, a power supply, and an electrical heater arranged to heat an aerosol-forming substrate when the aerosol-forming substrate is received within the cavity. The method comprises a step of controlling a supply of power from the power supply to the electrical heater for a first time period. The method also comprises a step of determining a rate of increase in temperature of the electrical heater during the first time period. The method also comprises a step of adjusting a supply of power from the power supply to the electrical heater during a second time period after the first time period, wherein the supply of power from the power supply to the electrical heater during the second time period is adjusted based on the determined rate of increase in temperature during the first time period.

As described herein with respect to the first aspect of the present invention, the determined rate of increase in temperature of the electrical heater may be indicative of a water content of the aerosol-forming substrate. A relatively low determined rate of increase in temperature may be indicative of a relatively high water content. A relatively high determined rate of increase in temperature may be indicative of a relatively low water content. Advantageously, based on the determined rate of increase in temperature, a supply of power to the electrical heater during a subsequent second time period may be adjusted to adjust further heating of the electrical heater.

Preferably, the first time period is sufficiently long to ensure a measurable increase in the temperature of the electrical heater across a range of water contents for the aerosol-forming substrate. Preferably, the first time period is at least about 1 second, more preferably at least about 2 seconds, more preferably at least about 3 seconds.

Preferably, the first time period is sufficiently short to minimise the time before adjusting the supply of power to the electrical heater during the second time period to provide a desired user experience. Preferably, the first time period is less than about 15 seconds, more preferably less than about 14 seconds, more preferably less than about 13 seconds, more preferably less than about 12 seconds, more preferably less than about 11 seconds, more preferably less than about 10 seconds.

The step of determining a rate of increase in temperature of the electrical heater may comprise determining an increase in temperature of the electrical heater over a fixed time period. The step of determining a rate of increase in temperature of the electrical heater may comprise determining a rate of increase in temperature of the electrical heater for the entire first time period. The step of determining a rate of increase in temperature of the electrical heater may comprise determining a rate of increase in temperature of the electrical heater based on a first temperature of the electrical heater determined at the start of the first time period and a second temperature of the electrical heater determined at the end of the first time period.

The step of determining a rate of increase in temperature of the electrical heater may comprise determining the time taken for a predetermined increase in temperature of the electrical heater to occur. The step of determining a rate of increase in temperature of the electrical heater may comprise determining a rate of increase in temperature of the electrical heater during a portion of the first time period. The step of determining a rate of increase in temperature of the electrical heater may comprise determining a time taken for a temperature of the electrical heater to increase from a first predetermined temperature to a second predetermined temperature during the first time period, wherein the determined time is the determined rate of increase in temperature.

Preferably, the first predetermined temperature is above any anticipated ambient temperature. Advantageously, a first predetermined temperature above ambient temperature may minimise or eliminate any variation in ambient temperature on the determined rate of increase in temperature of the electrical heater. Preferably, the first predetermined temperature is at least about 50 degrees Celsius, preferably at least about 60 degrees Celsius, preferably at least about 70 degrees Celsius, preferably at least about 80 degrees Celsius, preferably at least about 90 degrees Celsius. The first predetermined temperature may be about 100 degrees Celsius.

Preferably, the second predetermined temperature is below a target operating temperature of the electrical heater during the second period of time. Advantageously, a second predetermined temperature below a target operating temperature may facilitate determination of the rate of increase in temperature of the electrical heater before adjusting the supply of power to the electrical heater during the second time period. Preferably, the second predetermined temperature is less than about 300 degrees Celsius, preferably less than about 290 degrees Celsius, preferably less than about 280 degrees Celsius, preferably less than about 270 degrees Celsius, preferably less than about 260 degrees Celsius. The second predetermined temperature may be about 250 degrees Celsius.

Preferably, the step of controlling a supply of power from the power supply to the electrical heater for a first time period comprises supplying power from the power supply to the electrical heater at a constant rate for the first time period. Advantageously, supplying power to the electrical heater at a constant rate for the first time period may facilitate an accurate determination of the rate of increase in temperature of the electrical heater during the first time period.

Preferably, the step of adjusting a supply of power from the power supply to the electrical heater during a second time period comprises supplying power from the power supply to the electrical heater at a first rate or a second rate during the second time period based on a comparison of the determined rate of increase in temperature with a first threshold, wherein the second rate is larger than the first rate. The first rate may be described as a reduced rate or a lower rate. The second rate may be described as a normal rate. The first threshold may be indicative of a threshold between a normal water content of the aerosol-forming substrate and a high water content of the aerosol-forming substrate. In other words, a determined rate of increase in temperature below the first threshold may be indicative of a high water content of the aerosol-forming substrate. A determined rate of increase in temperature above the first threshold may be indicative of a normal water content of the aerosol-forming substrate.

In embodiments in which a rate of increase in temperature of the electrical heater is determined by determining an increase in temperature of the electrical heater over a fixed time period, the first threshold may be a temperature increase threshold. The step of adjusting a supply of power from the power supply to the electrical heater during a second time period comprises supplying power to the electrical heater at the first rate when the determined increase in temperature is below the first threshold. The step of adjusting a supply of power from the power supply to the electrical heater during a second time period comprises supplying power to the electrical heater at the second rate when the determined increase in temperature is above the first threshold. The first threshold may be a temperature increase of between about 230 degrees Celsius and about 250 degrees Celsius. The first threshold may be a temperature increase of between about 240 degrees Celsius and about 250 degrees Celsius.

In embodiments in which a rate of increase in temperature of the electrical heater is determined by determining the time taken for a predetermined increase in temperature of the electrical heater to occur, the first threshold may be a time threshold. The step of adjusting a supply of power from the power supply to the electrical heater during a second time period comprises supplying power to the electrical heater at the first rate when the determined time is above the first threshold. The step of adjusting a supply of power from the power supply to the electrical heater during a second time period comprises supplying power to the electrical heater at the second rate when the determined time is below the first threshold. The first threshold may be a time of between about 5 seconds and about 6 seconds. The first threshold may be a time of about 5.2 seconds.

Preferably, the step of adjusting a supply of power from the power supply to the electrical heater during a second time period comprises preventing the supply of power from the power supply to the electrical heater based on a comparison of the determined rate of increase in temperature with a second threshold, wherein the second threshold is different to the first threshold. The second threshold may be indicative of a threshold between a normal water content of the aerosol-forming substrate and a low water content of the aerosol-forming substrate. In other words, a determined rate of increase in temperature below the second threshold may be indicative of a normal water content of the aerosol-forming substrate. A determined rate of increase in temperature above the second threshold may be indicative of a low water content of the aerosol-forming substrate.

In embodiments in which the step of determining a rate of increase in temperature of the electrical heater comprises determining an increase in temperature of the electrical heater over a fixed time period, the second threshold may be a temperature increase threshold. The step of adjusting a supply of power from the power supply to the electrical heater during a second time period comprises supplying power to the electrical heater at the second rate when the determined increase in temperature is above the first threshold and below the second threshold. The step of adjusting a supply of power from the power supply to the electrical heater during a second time period comprises preventing the supply of power to the electrical heater when the determined increase in temperature is above the second threshold. The second threshold may be a temperature increase of between about 310 degrees Celsius and about 330 degrees Celsius. The second threshold may be a temperature increase of between about 310 degrees Celsius and about 320 degrees Celsius.

In embodiments in which the step of determining a rate of increase in temperature of the electrical heater comprises determining the time taken for a predetermined increase in temperature of the electrical heater to occur, the second threshold may be a time threshold. The step of adjusting a supply of power from the power supply to the electrical heater during a second time period comprises supplying power to the electrical heater at the second rate when the determined time is below the first threshold and above the second threshold. The step of adjusting a supply of power from the power supply to the electrical heater during a second time period comprises preventing the supply of power to the electrical heater when the determined time is below the second threshold. The second threshold may be a time of between about 4 seconds and about 5 seconds.

Preferably, the method further comprises a step of determining an ambient temperature. The step of determining an ambient temperature may be performed before the step of controlling a supply of power from the power supply to the electrical heater for a first time period. The step of determining an ambient temperature may be performed after the step of controlling a supply of power from the power supply to the electrical heater for a first time period and before the step of determining a rate of increase in temperature of the electrical heater during the first time period. The step of determining an ambient temperature may be performed after the step of determining a rate of increase in temperature of the electrical heater during the first time period and before the step of adjusting a supply of power from the power supply to the electrical heater during a second time period.

In embodiments in which the first threshold is a temperature increase threshold, preferably, the step of adjusting a supply of power from the power supply to the electrical heater during a second time period comprises supplying power from the power supply to the electrical heater at the first rate when the determined increase in temperature of the electrical heater is below the first threshold and the determined ambient temperature is above an ambient temperature threshold.

In embodiments in which the first threshold is a time threshold, preferably, the step of adjusting a supply of power from the power supply to the electrical heater during a second time period comprises supplying power from the power supply to the electrical heater at the first rate when the determined time is above the first threshold and the determined ambient temperature is above an ambient temperature threshold.

In embodiments in which the first threshold is a temperature increase threshold, preferably, the step of adjusting a supply of power from the power supply to the electrical heater during a second time period comprises supplying power from the power supply to the electrical heater at the second rate when the determined increase in temperature of the electrical heater is below the first threshold and the determined ambient temperature is below the ambient temperature threshold.

In embodiments in which the first threshold is a time threshold, preferably, the step of adjusting a supply of power from the power supply to the electrical heater during a second time period comprises supplying power from the power supply to the electrical heater at the second rate when the determined time is above the first threshold and the determined ambient temperature is below the ambient temperature threshold.

Preferably, the ambient temperature threshold is between about 15 degrees Celsius and about 25 degrees Celsius, preferably between about 17 degrees Celsius and about 23 degrees Celsius. The ambient temperature threshold may be about 18 degrees Celsius.

According to a fourth aspect of the present invention there is provided a computer program that, when executed on a computer or other processing device, carries out the method of the third aspect of the present invention, in accordance with any of the embodiments described herein. The computer program may be implemented as a software product suitable for running on an aerosol-generating device having a programmable controller as well as other required hardware elements, such as an electrical heater and a power supply.

According to a fifth aspect of the present invention there is provided an aerosol-generating device comprising a cavity for receiving an aerosol-forming substrate and an electrical heater arranged to heat an aerosol-forming substrate when the aerosol-forming substrate is received within the cavity. The aerosol-generating device also comprises a power supply and a controller arranged to control a supply of power from the power supply to the electrical heater during a first time period and a second time period after the first time period. The controller is also arranged to determine an ambient temperature. The controller is also arranged to adjust the supply of power from the power supply to the electrical heater during the second time period based on the determined ambient temperature.

The controller may be arranged to determine the ambient temperature before the first time period. The controller may be arranged to determine the ambient temperature at the start of the first time period. The controller may be arranged to determine the ambient temperature during the first time period. The controller may be arranged to determine the ambient temperature at the end of the first time period.

Preferably, the controller is arranged to supply power from the power supply to the electrical heater at a first rate during the second time period when the determined ambient temperature is above an ambient temperature threshold.

Preferably, the controller is arranged supply power from the power supply to the electrical heater at a second rate during the second time period when the determined ambient temperature is below the ambient temperature threshold, wherein the second rate is larger than the first rate.

Preferably, the ambient temperature threshold is between about 15 degrees Celsius and about 25 degrees Celsius, preferably between about 17 degrees Celsius and about 23 degrees Celsius. The ambient temperature threshold may be 18 degrees Celsius.

The aerosol-generating device may comprise a temperature sensor arranged to sense the ambient temperature, wherein the controller is arranged to determine the ambient temperature based on a signal received from the temperature sensor. The temperature sensor may comprise a thermistor. The temperature sensor may comprise a thermocouple. The temperature sensor may comprise a semiconductor temperature sensor.

The aerosol-generating device may comprise any of the features described herein with reference to the first aspect of the present invention.

According to sixth aspect of the present invention, there is provided an aerosol-generating system comprising an aerosol-generating device according to the fifth aspect of the present invention, in accordance with any of the embodiments described herein, and an aerosol-generating article comprising an aerosol-forming substrate. The aerosol-generating system may comprise any of the features described herein with reference to the second aspect of the present invention.

According to a seventh aspect of the present invention, there is provided a method of controlling an aerosol-generating device having a cavity for receiving an aerosol-forming substrate, a power supply, and an electrical heater arranged to heat an aerosol-forming substrate when the aerosol-forming substrate is received within the cavity. The method comprises a step of controlling a supply of power from the power supply to the electrical heater for a first time period. The method also comprises a step of determining an ambient temperature. The method also comprises a step of adjusting a supply of power from the power supply to the electrical heater during a second time period after the first time period, wherein the supply of power from the power supply to the electrical heater during the second time period is adjusted based on the determined ambient temperature.

The step of determining an ambient temperature may be performed before the step of controlling a supply of power from the power supply to the electrical heater for a first time period. The step of determining an ambient temperature may be performed at the start of the first time period. The step of determining an ambient temperature may be performed during the first time period. The step of determining an ambient temperature may be performed at the end of the first time period.

Preferably, the step of adjusting a supply of power from the power supply to the electrical heater during a second time period comprises supplying power from the power supply to the electrical heater at a first rate during the second time period when the determined ambient temperature is above an ambient temperature threshold Preferably, the step of adjusting a supply of power from the power supply to the electrical heater during a second time period comprises supplying power from the power supply to the electrical heater at a second rate during the second time period when the determined ambient temperature is below the ambient temperature threshold, wherein the second rate is larger than the first rate.

Preferably, the ambient temperature threshold is between about 15 degrees Celsius and about 25 degrees Celsius, preferably between about 17 degrees Celsius and about 23 degrees Celsius. The ambient temperature threshold may be 18 degrees Celsius.

The method may comprise any of the features described herein with reference to the third aspect of the present invention.

According to an eighth aspect of the present invention there is provided a computer program that, when executed on a computer or other processing device, carries out the method of the seventh aspect of the present invention, in accordance with any of the embodiments described herein. The computer program may be implemented as a software product suitable for running on an aerosol-generating device having a programmable controller as well as other required hardware elements, such as an electrical heater and a power supply.

The invention will now be further described, by way of example only, with reference to the accompanying drawings in which.

Figure 1:
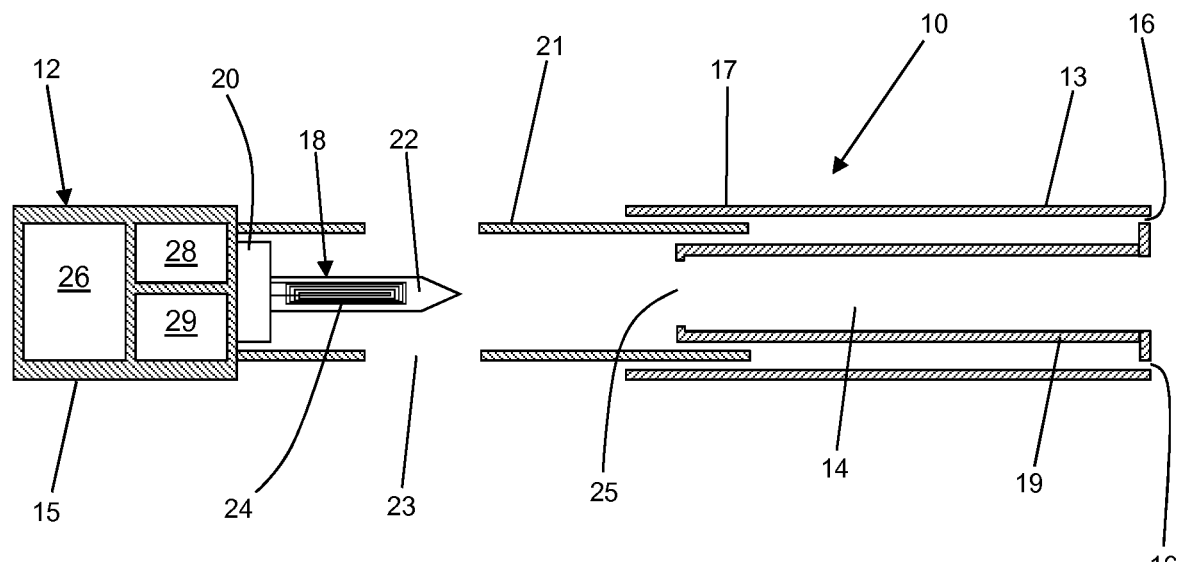
FIG. 1 shows a cross-sectional view of an aerosol-generating device according to an embodiment of the present invention.

FIG. 1 shows a cross-sectional view of an aerosol-generating device 10 according to an embodiment of the present invention. The aerosol-generating device 10 comprises a generally cylindrical housing 12 comprising a front housing portion 13 and a rear housing portion 15. The front housing portion 13 is slidably removable from the rear housing portion 15 and is illustrated in a partially removed position in FIG. 1.

The front housing portion 13 comprises an outer wall 17 and an inner wall 19, wherein the inner wall 19 defines a cavity 14 for receiving an aerosol-forming substrate. A plurality of air inlets 16 for admitting air into the aerosol-generating device 12 are defined between the outer wall 17 and the inner wall 19 at an end of the front housing portion 13.

The rear housing portion 15 comprises a cylindrical wall 21 that is received between the outer wall 17 and the inner wall 19 of the front housing portion 13 when the front housing portion 13 is received on the rear housing portion 15. The cylindrical wall 21 defines a plurality of elongate slots 23.

The aerosol-generating device 10 also comprises an electrical heater 18 positioned on the rear housing portion 15 and arranged to extend through an aperture 25 defined by the inner wall 19 and into the cavity 14 when the front housing portion 13 is received on the rear housing portion 15. During use, air flows into the aerosol-generating device 10 through the air inlets 16, through the slots 23 defined by the cylindrical wall 21, and through the aperture 25 into the cavity 14.

The electrical heater 18 comprises a base portion 20 and an elongate electrically insulating substrate 22 extending from the base portion 20. The elongate electrically insulating substrate 22 is formed from a ceramic material. The elongate electrically insulating substrate 22 is blade shaped to facilitate insertion of the elongate electrically insulating substrate 22 into an aerosol-forming substrate when the aerosol-forming substrate is received within the cavity 14.

The electrical heater 18 also comprises a plurality of resistive heating elements 24 positioned on the elongate electrically insulating substrate 22.

The aerosol-generating device 10 also comprises a power supply 26, a controller 28 and a temperature sensor 29. The controller 28 may be arranged to perform several functions including controlling the supply of power from the power supply 26 to the resistive heating element 24 of the electrical heater 18. The power supply 26 comprises a rechargeable battery.

Figure 2:
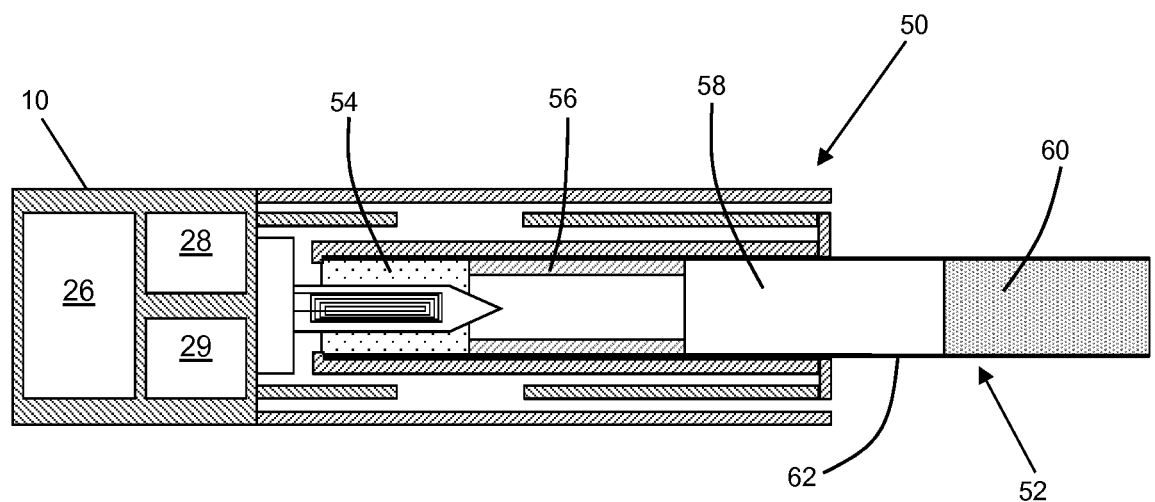
FIG. 2 shows a cross-sectional view of an aerosol-generating system comprising the aerosol-generating device of FIG. 1.

FIG. 2 shows a cross-sectional view of an aerosol-generating system 50 comprising the aerosol-generating device 10 of FIG. 1 and an aerosol-generating article 52 received within the cavity 14 of the aerosol-generating device 10. The aerosol-generating device 10 is illustrated in FIG. 2 with the front housing portion 13 fully received on the rear housing portion 15.

The aerosol-generating article 52 comprises an aerosol-forming substrate 54 in the form of a tobacco plug, a hollow acetate tube 56, a polymeric filter 58, a mouthpiece 60 and an outer wrapper 62. When the aerosol-generating article 52 is received within the cavity 14 of the aerosol-generating device 10, the elongate electrically insulating substrate 22 and the resistive heating element 24 of the electrical heater 18 are received within the tobacco plug.

Figure 3:
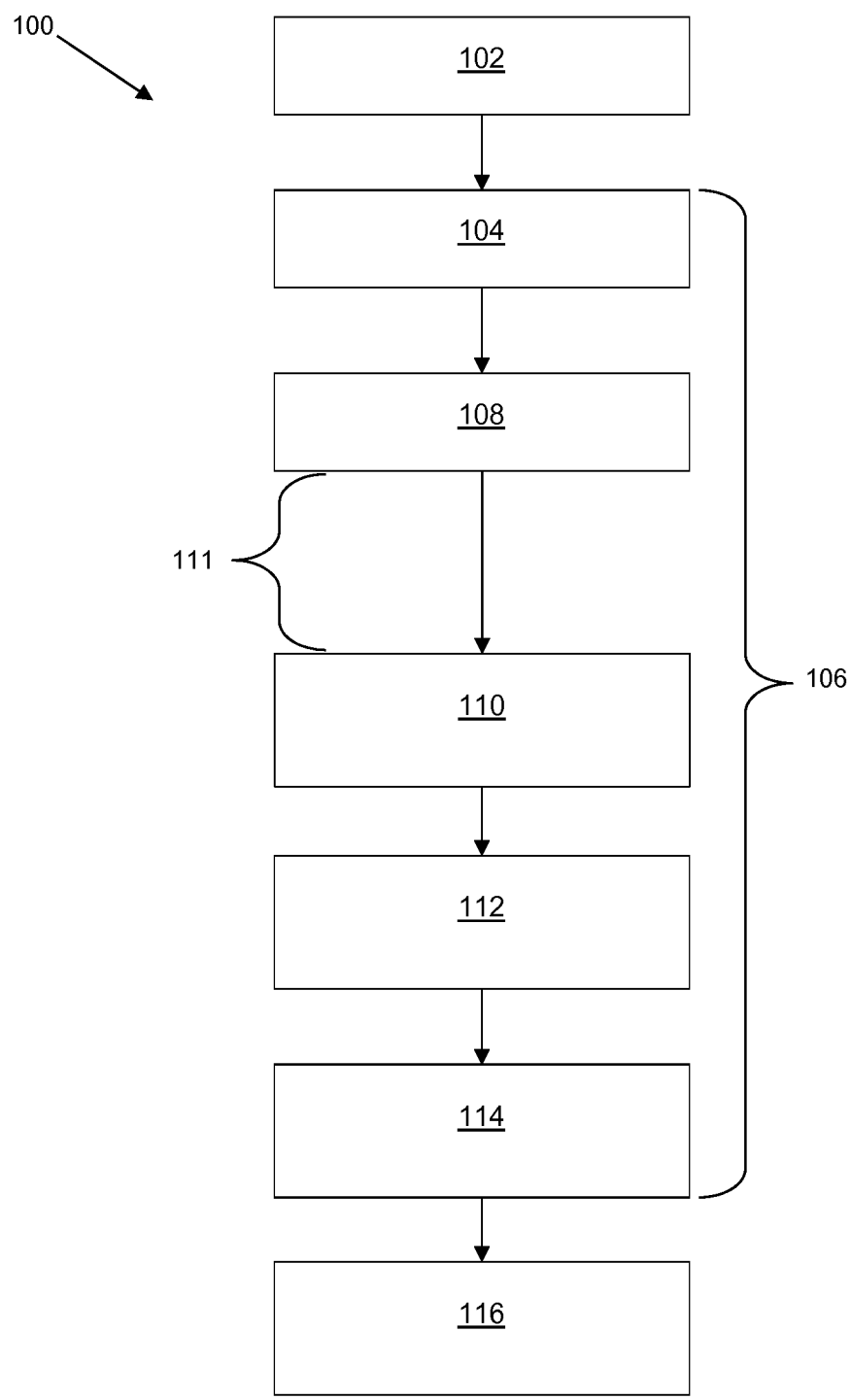
FIG. 3 illustrates a method carried out by the controller of the aerosol-generating device of FIG. 1.

The controller 28 of the aerosol-generating device 10 is arranged to carry out the method 100 illustrated in FIG. 3 when the aerosol-generating article 52 is inserted into the cavity 14 and the aerosol-generating device 10 is switched on by a user.

In a first step 102, the controller 28 determines an ambient temperature using the temperature sensor 29.

In a second step 104, the controller 28 starts a supply of power at a constant rate from the power supply 26 to the electrical heater 18 at the start of a first time period 106.

In a third step 108, the controller 28 records a first time at which the electrical heater 18 reaches a first predetermined temperature of 100 degrees Celsius. The controller 28 is arranged to determine the temperature of the electrical heater 18 by measuring a resistance of the resistive heating element 24 and comparing the measured resistance to calibrated curve of resistance against temperature stored in the controller 28.

In a fourth step 110, the controller 28 records a second time at which the electrical heater 18 reaches a second predetermined temperature of 250 degrees Celsius. In a fifth step 112, the controller 18 determines a rate of increase in temperature of the electrical heater 18 during the first period. In particular, the controller 18 determines the difference between the first time and the second time to determine the time taken 111 for the temperature of the electrical heater 18 to increase from the first predetermined temperature to the second predetermined temperature. The time taken is partially determined by a water content of the aerosol-forming substrate 54. If the aerosol-forming substrate 54 has a relatively high water content, vaporisation of water from the aerosol-forming substrate 54 increases the rate of transfer of thermal energy from the electrical heater 18 during the first time period 106, which results in a slower increase in temperature and a longer time taken 111 to reach the second predetermined temperature. If the aerosol-forming substrate 54 has a relatively low water content, reduced vaporisation of water from the aerosol-forming substrate 54 reduces the rate of transfer of thermal energy from the electrical heater 18 during the first time period 106, which results in a faster increase in temperature and a shorter time taken 111 to reach the second predetermined temperature.

In a sixth step 114, the controller 28 ends the first time period of a supply of power to the electrical heater 18 at a constant rate and starts a second time period 116. During the second time period 116, the controller 28 supplies power from the power supply 26 to the electrical heater 18 at a rate determined by the ambient temperature and the determined time taken for the temperature of the electrical heater 18 to increase from the first predetermined temperature to the second predetermined temperature. If the time taken is below a first threshold of 5.2 seconds and above a second threshold of 4 seconds, the controller 28 supplies power to the electrical heater 18 at a predetermined normal rate. If the time taken is above the first threshold and the determined ambient temperature is above an ambient temperature threshold of 18 degrees Celsius, the controller 28 supplies power to the electrical heater 18 at a reduced rate that is lower than the normal rate. If the time taken is above the first threshold and the determined ambient temperature is below the ambient temperature threshold, the controller 28 supplies power to the electrical heater 18 at the normal rate. If the time take is below the second threshold, the controller 28 prevents the second supply of power to the electrical heater 18 to prevent further heating of the aerosol-forming substrate 54.

The invention claimed is:

1. An aerosol-generating device, comprising:
   a cavity configured to receive an aerosol-forming substrate;
   an electrical heater configured to heat the aerosol-forming substrate when the aerosol-forming substrate is received within the cavity;
   a power supply; and
   a controller configured to:
      control a supply of power from the power supply to the electrical heater during a first time period and a second time period after the first time period,
      determine a rate of increase in temperature of the electrical heater during the first time period by determining a time taken for a temperature of the electrical heater to increase from a first predetermined temperature to a second predetermined temperature during the first time period, and
      adjust the supply of power from the power supply to the electrical heater during the second time period based on the determined rate of increase in temperature during the first time period.

2. The aerosol-generating device according to claim 1, wherein the controller is further configured to supply power from the power supply to the electrical heater at a constant rate for the first time period.

3. The aerosol-generating device according to claim 1, wherein the controller is further configured to supply power from the power supply to the electrical heater at a first rate during the second time period when the determined time is above a first threshold.

4. The aerosol-generating device according to claim 3, wherein the controller is further configured to supply power from the power supply to the electrical heater at a second rate during the second time period when the determined time is below the first threshold, and wherein the second rate is larger than the first rate.

5. The aerosol-generating device according to claim 3, wherein the controller is further configured to prevent the supply of power from the power supply to the electrical heater during the second time period when the determined time is below a second threshold, and wherein the second threshold is smaller than the first threshold.

6. The aerosol-generating device according to claim 4, wherein the controller is further configured to:
determine an ambient temperature,
supply power from the power supply to the electrical heater at the first rate when the determined time is above the first threshold and the determined ambient temperature is above an ambient temperature threshold, and
supply power from the power supply to the electrical heater at the second rate when the determined time is above the first threshold and the determined ambient temperature is below the ambient temperature threshold.

7. The aerosol-generating device according to claim 6, further comprising a temperature sensor configured to sense the ambient temperature,
wherein the controller is further configured to determine the ambient temperature based on a signal received from the temperature sensor.

8. The aerosol-generating device according to claim 1, wherein the electrical heater comprises a resistive heating element, and
wherein the controller is further configured to determine a temperature of the resistive heating element based on a resistance of the resistive heating element.

9. An aerosol-generating system, comprising:
an aerosol-generating device according to claim 1; and
an aerosol-generating article comprising an aerosol-forming substrate.

10. The aerosol-generating system according to claim 9, wherein the aerosol-forming substrate comprises tobacco.

11. A method of controlling an aerosol-generating device having a cavity configured to receive an aerosol-forming substrate, a power supply, and an electrical heater configured to heat an aerosol-forming substrate when the aerosol-forming substrate is received within the cavity, the method comprising the steps of:
controlling a supply of power from the power supply to the electrical heater for a first time period;
determining a rate of increase in temperature of the electrical heater during the first time period by determining a time taken for a temperature of the electrical heater to increase from a first predetermined temperature to a second predetermined temperature; and
adjusting a supply of power from the power supply to the electrical heater during a second time period after the first time period,
wherein the supply of power from the power supply to the electrical heater during the second time period is adjusted based on the determined rate of increase in temperature during the first time period.

12. The method according to claim 11, wherein the step of controlling a supply of power from the power supply to the electrical heater for a first time period comprises supplying power from the power supply to the electrical heater at a constant rate for the first time period.

13. A nontransitory computer-readable storage medium having a computer program stored thereon that when executed on a computer or other processing device, causes the computer or the other processing device to perform the method of claim 11.

* * * * *